(12) United States Patent
Strayer et al.

(10) Patent No.: US 7,854,003 B1
(45) Date of Patent: Dec. 14, 2010

(54) METHOD AND SYSTEM FOR AGGREGATING ALGORITHMS FOR DETECTING LINKED INTERACTIVE NETWORK CONNECTIONS

(75) Inventors: William Timothy Strayer, West Newton, MA (US); Christine Elaine Jones, Spokane Valley, WA (US); Isidro Marcos Castineyra, Somerville, MA (US); Regina Rosales Hain, Winchester, MA (US)

(73) Assignee: Verizon Corporate Services Group Inc. & Raytheon BBN Technologies Corp., Basking Ridge, NJ (US)

( * ) Notice: Subject to any disclaimer, the term of this patent is extended or adjusted under 35 U.S.C. 154(b) by 1677 days.

(21) Appl. No.: 11/077,341

(22) Filed: Mar. 10, 2005

Related U.S. Application Data

(60) Provisional application No. 60/554,366, filed on Mar. 19, 2004.

(51) Int. Cl.
  *G06F 11/00* (2006.01)
  *G06F 12/14* (2006.01)
  *G06F 12/16* (2006.01)
  *G08B 23/00* (2006.01)

(52) U.S. Cl. .................................................. 726/23

(58) Field of Classification Search .............. 726/22, 726/23
  See application file for complete search history.

(56) References Cited

U.S. PATENT DOCUMENTS

| | | | |
|---|---|---|---|
| 6,513,065 B1 * | 1/2003 | Hafez et al. ............... | 709/224 |
| 2002/0019764 A1 * | 2/2002 | Mascarenhas ............. | 705/10 |
| 2003/0182282 A1 * | 9/2003 | Ripley ....................... | 707/5 |

OTHER PUBLICATIONS

Yin Zhang, Vern Paxson, "Detecting Stepping Stones", 2000, pp. 1-21.*

Wang, X., Reeves, D.S., Wu, S.F. and Yuill, J.—Sleepy Watermark Tracing: An Active Network-Based Intrusion Response Framework (16 pages) Jun. 2001.

Yoda, K. and Etoh, H.—Finding a Connection Chain for Tracing Intruders (15 pages) Oct. 2000.

Zhang, Y. and Paxson, V.—Detecting Stepping Stones (21 pages) Aug. 2000.

Belenky, A., and Ansari, on IP Traceback. *IEEE Communications Magazine 41, 7* (2003), 142-153.

Bellovin, S.M., Leech, M., and Taylor, T. ICMP traceback messages. Internet Draft, Oct. 2001. draft-ietf-itrace-01.text (work in progress).

Bloom, B.H. Space/time trade-offs in hash coding with allowable errors. Communications *of ACM 13*, 7 (Jul. 1970), 422-426.

Buchholz, F.P. and Shields, C. Providing process origin information to aid in network traceback. In *Proc. USENIX Annual Technical Conference* (Jun. 2002).

Burch, H., and Cheswick, B. Tracing anonymous packets to their approximate source. In *Proc. USENIX LISA '00* (Dec. 2000).

(Continued)

*Primary Examiner*—Benjamin E Lanier
*Assistant Examiner*—Cordelia Zecher

(57) ABSTRACT

A method and system is provided for detecting correlated connections in an extended connection. A plurality of stepping stone detection algorithms are executed in parallel (400), each of the plurality of stepping stone detection algorithms generating a result. The results are scored for each of the plurality of stepping stone detection algorithms (402). A consensus attack path is generated based upon the scored results (404).

15 Claims, 4 Drawing Sheets

OTHER PUBLICATIONS

Cappe, O., Moulines, E. Pesquet, J.C., Petropulu, A., Yang, X. Long-range dependence and heavy-tail modeling for teletraffic data. *IEEE Signal Processing Magazine 19-3 (2002)*, 14-27.

Carrier, B., and Shields, C. A recursive session token protocol for use in computer forensics and tcp traceback. In *Proc. IEEE Infocom '02* (Jun. 2002).

Donoho, D.L., Flesia, A.G., Shankar, U., Paxson, V., Coit, J., and Staniford, S. Multiscale stepping-stone detection: Detecting pairs of jittered interactive streams by exploiting maximum tolerable delay. *In Proc. International Symposium on Recent Advances in Intrusion Detection* (Oct. 2002), pp. 14-35.

Egevang, K., and Francis, P. The ip network address translator. RFC 1631, May 1994.

Fan, L., Cao, P. Almeida, J., and Broder, A.Z. Summary cache: a scalable wide-area web cache sharing protocol. *ACM/IEEE Trans. On Networking 8*, 3 (2000), 281-293.

Ferguson, P. and Senie, D. Network ingress filtering: Defeating denial of service attacks which employ IP source address spoofing. RFC 2267, Jan. 1998.

Hazeyama, H., Oe, M., and Kadobayashi, Y. A layer-2 extension to hash-based IP traceback. *IEICE Trans. on Information & Systems*, Nov. 2003.

Howard, J.D. An analysis of security incidents on the internet. 1989-1995. PhD Thesis. Apr. 1997. http://www.cert.org/research/JHThesis/Start.html.

Johns, M. S. Identification Protocol. RFC 1413, Feb. 1993.

Jones, C.E., Tchakountio, F., Snoeren, A.C., Schwartz, B., Clements, R.C., Condell, M., Partridge, C., and Strayer, W.T. Traceback of ip packet transformations. Internal technical memo, BBN Technologies, 2002.

Jung, H.T., Kim, H.L., Seo, Y., Choe, G., Min, S.L., and Kim, C.S. Caller identification system in the internet environment. In *Proc. USENIX Security Symposium '93* (Oct. 1993).

Lee, S.C., and Shields, C. Tracing the source of network attack: A technical, legal and societal problem. In Proc. *IEEE Systems, Man, and Cybernetics Information Assurance Workshop* (2001).

Libes, D. The Expect home page. Tech. rep., National Institute of Standards and Technology. http://expect.nist.gov/. Jun. 11, 2004.

Mankin, A., Massey, D., Wu, C.L. Wu, S.F., and Zhang, L. On design and evaluation of "intention-driven" ICMP traceback. In *Proc. IEEE International Conference on Computer Communications and Networks* (Oct. 2001).

Partridge, C., Cousins, D.B., Jackson, A.W., Krishnan, R., Saxena, T., and Strayer, W.T. Using signal processing to analyze wireless data traffic. In Proc. *ACM Workshop on Wireless Security (WiSe)* (Sep. 2002).

Paxson, V. Bro: A system for detecting network intruders in real-time. In *Proc. USENIX Security Symposium, Jan. 1998.*

Paxson, V. An analysis of using reflectors for distributed denial-of-service attacks. *ACM Comp. Comm. Review 31.3* (2001).

Perkins, C.E. IP mobility support for IPv4. RFC 3344. Aug. 2002.

Rekhter, Y., Moskowitz, B., Karrenberg, D., De Groot, G.J., and Lear, E. Address allocation for private internets. RFC 1918, Feb. 1996.

Sager, G. Security fun with OCxmon and cflowd. Internet 2 Working Group Meeting, Nov. 1998. http://www.caida.org/projects/NGI/content/security/1198.

Sanchez, L.A., Milliken, W.C., Snoeren, A.C., Tchakountio, F., Jones, C.E., Kent, S.T., Partridge, C., and Strayer, W.T. Hardware support for a hash-based IP traceback. *In Proc. Second DARPA Information Survivability Conference and Exposition* (Jun. 2001), vol. 2, pp. 146-152.

Savage, S., Wetherall, D., Karlin, A., and Anderson, T. Network support for IP traceback. *ACM/IEEE Trans. on Networking 9, 3* (Jun. 2001), 226-239.

Schnackenberg, D., Djahandari, K., and Sterne, D. Infrastructure for intrusion detection and response. In *Proc. First DARPA Information Survivability Conference and Exposition* (Jan. 2000).

Snapp, S.R., Brentano, J., Dias, G.V., Goan, T.L., Heberlein, L.T., Ho, C.L., Levitt, K.N., Mukherjee, B., Smaha, S.E., Grance, T., Teal, D.M., and Mansur, D. DIDS (distributed intrusion detection system)—motivation, architecture, and an early prototype. In *Proc. National Computer Security Conference* (Oct. 1991), pp. 167-176.

Snoeren, A.C., Partridge, C., Sanchez, L.A., Jones, C.E., Tchakountio, F., Schwartz, B., Kent, S.T., and Strayer, W.T. Single-packet IP traceback. *ACM/IEEE Trans. on Networking* (Dec. 2002).

Song, D.X., and Perrig, A. Advanced and authenticated marking schemes for IP traceback. In *Proc. IEEE Infocom '01* (Apr. 2001).

Staniford-Chen, S., and Heberlein, L.T. Holding intruders accountable on the internet. In *Proc. IEEE Symposium on Security and Privacy '95* (May 1995), pp. 39-49.

Stone, R. CenterTrack: An IP overlay network for tracking DoS floods. In *Proc. USENIX Security Symposium '00* (Aug. 2000).

Wang, X., and Reeves, D.S. Robust correlation of encrypted attack traffic through stepping stones by manipulation of interpacket delays. In *Proc. ACM Symposium on Computer and Communications Security (CCS)* (Oct. 2003).

\* cited by examiner

METHOD AND SYSTEM FOR AGGREGATING ALGORITHMS FOR DETECTING LINKED INTERACTIVE NETWORK CONNECTIONS

CROSS-REFERENCE TO RELATED APPLICATIONS

The present application claims priority to U.S. Provisional Patent Application No. 60/554,366, filed Mar. 19, 2004, the entirety of which is incorporated by reference herein.

GOVERNMENT INTEREST

The invention described herein was made with government support. The U.S. Government may have certain rights in the invention, as provided by the terms of contract No. N66001-00-8038, awarded by the National Security Agency (NSA).

BACKGROUND

1. Field of the Invention

The present invention relates generally to communication networks, and more specifically, to the discovery of routes used by data transmitted over such networks.

2. Description of Related Art

Availability of low cost computers, high speed networking products, and readily available network connections has helped fuel proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with the rapid growth of the Internet have come problems caused by malicious individuals or pranksters launching attacks from within the network. As the size of the Internet continues to grow, so does the threat posed by these individuals.

The ever-increasing number of computers, routers and connections making up the Internet increases the number of vulnerability points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch, which can be compromised and configured to forward malicious packets onto the network.

There remains a need in the art for effective and efficient methods and systems for performing identification and attribution of network attacks.

SUMMARY OF THE INVENTION

Systems and methods consistent with principles of the invention may identify correlated connections in a network. In one implementation, a plurality of stepping stone detection algorithms are executed in parallel, each of the plurality of stepping stone detection algorithms generating a result. The results for each of the plurality of stepping stone detection algorithms are scored. A consensus connection is then generated based upon the scored results.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Methods and systems consistent with the principles of the invention may enable the discovery of stepping stone connections in a network attack path by examining connections identified utilizing several techniques, weighting and scoring the respective results and generating a consensus or accurate overall result.

Exemplary Network Configuration

Figure 2:
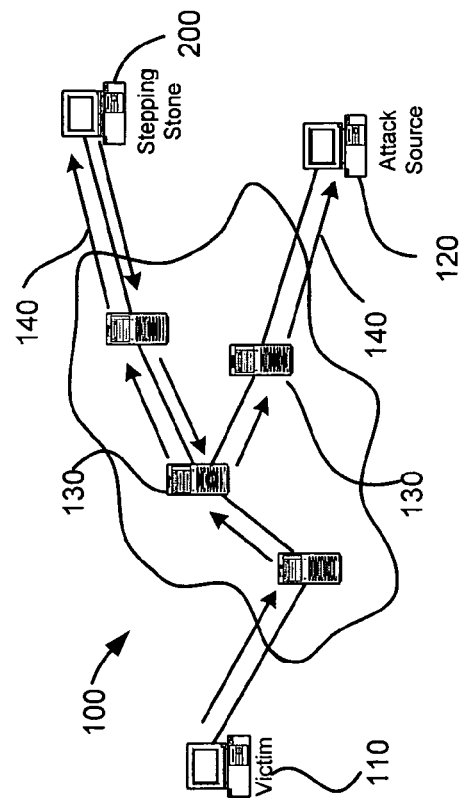
FIG. 2 is a diagram illustrating an exemplary network according to another implementation consistent with the present invention.
Figure 1:
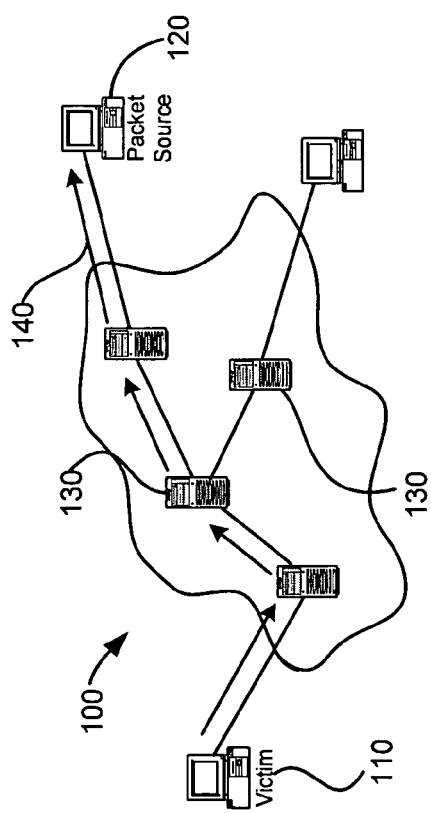
FIG. 1 is a diagram illustrating an exemplary network according to an implementation consistent with the present invention.

FIG. 1 is a diagram illustrating an exemplary network 100 traversed during a network attack. Network 100 includes a victim host 110, a packet source host 120 and several intermediate routers 130 which facilitate movement of the attack from the source to the victim. An IP traceback 140 that reaches a host has identified a potential source of a packet. However, this does not mean that the source of the attack has necessarily been determined. As shown in FIG. 2, the host may actually be a stepping stone host 200 mid-stream of the actual attack path.

Tracing an attack path through stepping stone hosts 200 requires the discovery of an association between two connections with endpoints at that host such that these connections act as consecutive links in a chain of connections. The chain of connections between an originating (or attack) source and the victim form what is called an extended connection.

An extended connection is constructed by a series of individual connections linked in a pairwise fashion and related by carrying the same underlying data (carried as plaintext or encrypted text) serially across each connection from the originating source to the ultimate destination. A connection pair is any two adjacent connections in the extended connection.

Once an extended connection has been identified, the attribution process turns to identifying two connections as related links in a larger chain of connections. Three classes of intermediate hosts may be used by an attacker to launder attack data and to obfuscate the attack path: stepping stones, zombies, and reflectors. An extended connection employed for launching an attack may involve any type and any number of such intermediate hosts.

Stepping Stones

The simplest type of intermediate host is a stepping stone host. Such a host is compromised to the extent that the attacker can log into the stepping stone host and establish an outgoing interactive connection (such as telnet, rlogin (remote login), or ssh (secure shell)) to the next host in the attack path. The attacker's communications are not fundamentally altered, though enough may change to evade some methods of detection. For instance, if one or both connections are established using ssh, encryption will prevent use of any traceback method based on packet content. Processing delays in the host may also superficially alter timing of packets. An attacker will usually chain multiple stepping stones together to further screen the attack's origin.

An attacker need not deeply compromise a host to create a stepping stone. All that is needed is access to an ordinary user's privileges to log in and to make outgoing connections. Such access can be gained, for instance, by dictionary attacks on password files or by snooping for passwords in Internet cafes or computer labs. Root access (or equivalent) is rarely required, though a more permanent back door could be more easily established with such privileges.

One difficulty with the detection of stepping stones 200 is the large number of legitimate uses of extended connections. Commonly, access to hosts by legitimate users from outside a network is via a trusted gateway host through which the user connects to the target host. And frequently, by habit if for no other reason, a user will casually connect to some other host as needed by beginning a new session from his current target host.

Zombies

A zombie host may be defined as an intermediate host at which incoming communication is transformed such that the resulting outgoing communication appears to be wholly unconnected, and delays measured in hours or days are introduced prior to the establishment of the outgoing communication. The attacker's incoming communication may be script and code to install a Trojan, and the attack output might come days or months later (say in response to a cron table entry). Another zombie may accept simple trigger commands from the attacker to execute previously planted code that issues entirely different output, for instance as part of a distributed denial-of-service (DDoS) attack.

The lack of apparent relationship between the incoming attack stream and the outgoing attack data, as well as the extremely long interval that may ensue between the end of one and the start of the other, makes the traceback problem in the network a very difficult one. Consider the example of a DDoS attack being triggered by a timer. Once the attack is under way, it is generally easy to determine the immediate source of the last link or two in the attack path. But once the zombie running the Trojan script is identified, it is difficult to associate the attack output with the incoming communication that generated the attack. Since the incoming connection (over which the Trojan was downloaded and installed) could have existed weeks or more in the past, the network retains no information about it. An investigator must examine host logs, if access can be obtained, and even then a cleverly written Trojan may have altered those logs when installed. Even if the DDoS attack is initiated by a packet containing a trigger command, there may very likely be insufficient data to associate that trigger packet with the outgoing attack connection.

Reflectors

It is also possible to launder an attack through an innocent, intact host operating normally, by using it as a reflector. For instance, an attacker logged into a host (possibly as part of an attack chain) may generate packets with the IP address of the ultimate attack victim forged as the source of the packets. The response packets are directed to the victim and constitute the actual attack. By bouncing such spoofed packets off a large number of normally operating reflectors, massive quantities of bogus responses are directed at the victim. This attack must be detected in the network, as there is no need for the attacker ever to have communicated with the reflector to set up the attack, hence no evidence of the attack or any tampering can be found on the host.

Attributing an attack to a particular source or set of sources requires understanding what can happen to the packets used to perpetuate the attack as they traverse the network. The IP routing infrastructure is stateless and based largely on destination addresses; the source address plays virtually no role in the forwarding of a packet to its destination other than providing a return address in the case of bidirectional communication. In this respect, IP packets are essentially fire-and-forget types of delivery mechanisms; once a packet is introduced into the network, there is no need for the packet to maintain any relationship with its source. The source IP address carries no semantic of trust, but it is the only clue built into the network infrastructure as to the proper source. Attackers take advantage of this property of the IP protocol by manipulating—either directly or indirectly—the source address of attack packets to obscure their true origin.

Stepping stone detection techniques generally attempt to determine the correlation between all pairs of connections such that the pairs related by being part of the same extended connection will have correlation scores that are higher than those that are not related. Unfortunately, these techniques make several simplifying assumptions about the network that may not be valid in an operational environment. A first general assumption is that the source address is valid because TCP connections require bidirectional communication. It is true that an attacker cannot effectively use a connection, especially an interactive one, with a spoofed source address, but this does not mean that the network is preserving the source address. Rather, the source address is actively modified by the network when the source is part of a privately addressed network, as one connected to the Internet via a network address translator (NAT). In this case, the source address is an address from the non-routable private address space as defined by RFC 1918. The attacker establishes a connection from his private network through a NAT to a compromised system in the Internet, possibly also within a privately addressed or corporate network where the IP addresses are not routable or not known.

A second general assumption is that connection pairs are easily stitched together to form the fully reconstructed extended connection. Consider three connections between four hosts, $H_1 \leftrightarrow H_2$, $H_2 \leftrightarrow H_3$, and $H_3 \leftrightarrow H_4$. The pair ($H_1 \leftrightarrow H_2$, $H_2 \leftrightarrow H_3$) can be detected at some point where all traffic into and out of $H_2$ is seen. Likewise with the pair ($H_2 \leftrightarrow H_3$, $H_3 \leftrightarrow H_4$). However, matching the two pairs into an extended connection assumes that, given one pair, the stitching algorithm knows where to find the other. The obvious clue is $H_3$'s address, but this suggests that there must be some global mapping of each host's address onto the data collection point handling the detection of stepping stones for that host. Outside of maintaining such a mapping, the easiest and most effective way to find the data collection point is if those points are closely tied to the routing infrastructure since the mapping of hosts onto routers is fairly well understood.

Figure 3:
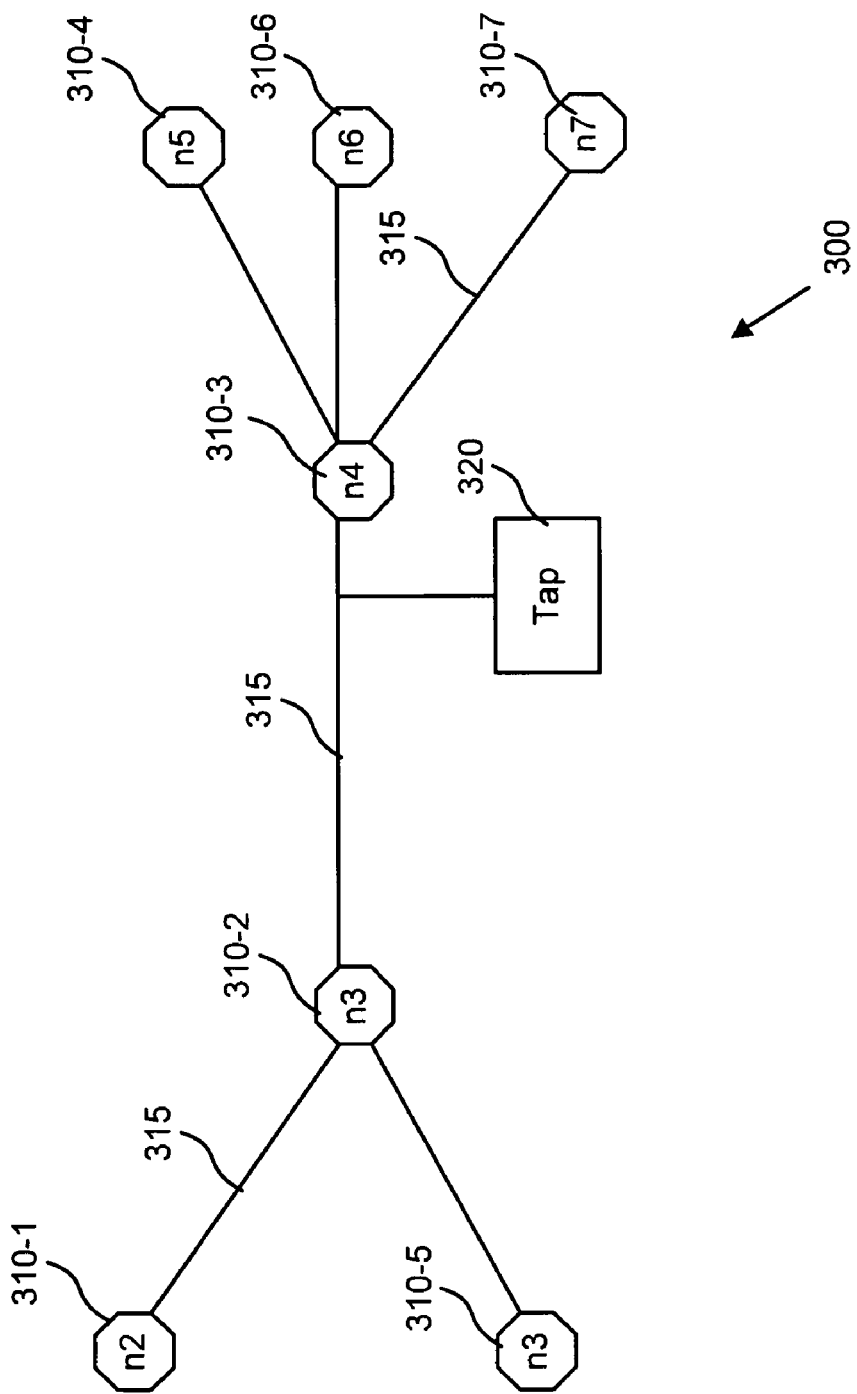
FIG. 3 is a diagram illustrating an exemplary network and tap according to an implementation consistent with the present invention.

FIG. 3 is a diagram illustrating an exemplary network 300 according to an implementation consistent with the present invention. Network 300 may include a number of network hosts 310-1 . . . 310-n (collectively "hosts 310") connected by a number of network links 315. Network hosts 310 may include such network devices as computers, routers, switches, etc. Network 300 may also include one or more network taps 320. Although seven hosts 310 and one tap 320 are shown connected in a particular configuration, this is purely exemplary. Network 300 may include any number and configuration of hosts 310, links 315, and taps 320.

Network hosts 310 may be configured to send and receive information according to a communication protocol, such as TCP/IP, UDP, etc. Although not specifically shown, some hosts 310 may be configured to generate a route for information to a specified destination. Other hosts 310 may be configured to send the information according to a previously-determined route. The network hosts 310 may communicate via discrete "chunks" of data that are transmitted by sending hosts 310. A chunk may be any individually detectable or distinguishable unit of data, such as a packet or grouping of packets. A monitoring device, such as tap 320, may determine when a chunk starts and ends. It should be clearly understood that a chunk of data need not exactly correspond to a packet of data. A chunk may represent part of a packet (e.g., a fragment or an ATM cell of an AAL5 PDU), or multiple packets (e.g., two packets concatenated). It should be understood that without loss of generality the aforementioned "chunks of data" are referred to as packets, even if a packet may be fragmented, or may comprise several smaller data units such as ATM cells.

Packets may be transmitted by sending hosts 310. A sending host 310 may be the most recent host 310 to transmit a particular packet (e.g., host n3 in FIG. 3, if the tap 320 intercepts a packet transmitted to host n4). The sending host 310 is not necessarily the node 310 that originated the packet.

Network links 315 may include electronic links (e.g., wires or coaxial cables), optical links (e.g., fiber optic cables), wireless links, or any combination of such links. These links 315 may provide a connection between two hosts 310 (e.g., hosts n1 and n3). It may be possible to physically tap into these links 315 to observe the information carried on them.

Network tap 320 is a device that may intercept packet transmissions on the network 300. Tap 320 may include a physical connection to a corresponding link 315 and circuitry to detect packets on link 315. Tap 320 may intercept packets at a physical layer, a link layer, a network layer, or at higher layers of network 300 being monitored. The layer at which interceptions occur is within the abilities of those skilled in the art, and may be chosen based on knowledge of, and access to, network links 315. Tap 320 may include, for example, a transceiver for sensing the packets of data and may also include other circuitry (e.g., clock circuitry) for determining times of arrival of the packets. Tap 320 may include a processor for computing any other information associated with the packets, such as information contained within a header of the packet (e.g., identity of a sending host and/or receiving host though IP addresses and port numbers).

Tap 320 may observe traffic on link 315 between hosts n3 and n4. Tap 320 may record information about all the packets that it observes in a "tracefile." The tracefile may contain a minimum amount of information for each observed packet. For example, the information may include the time the packet was seen and the identity of the sending host 310 of the packet. The identity of sending host 310 may include, for example, its IP address and the port over which the packet was sent. If available, the tracefile may also include additional information about the destination host 310, as well as insight into the contents of the packet. For example, other information that may be available for storage in the tracefile is the location of tap 320 along the link 315 relative to the hosts 310 at either end of link 315.

Tap 320 may not capture all traffic on link 315. For example, tap 320 may occasionally make an error and mistakenly believe it has seen a packet when no packet was sent (e.g., due to bit errors on network 300). If transmissions are missed, false transmissions are detected, or if a sending host 310 is misclassified, these events may be viewed as adding noise to the signals generated by tap 320. Other sources of noise in the signal generated by tap 320 may include interference from other signals (e.g., packets belonging to another flow, or jitter in timing due to sharing of a bottleneck among multiple flows).

Tap 320 may listen passively and may not participate in network 300 at the MAC (or higher) layers. In some cases, for example with 802.3 LANs, it is possible for the tap 320 to snoop at the MAC layer and extract some information about higher layer protocols. In the case of SONET networks, however, little or no information may be available about the MAC or higher layer protocols. Such passive listening may also be referred to as covert information collection.

Although a single tap 320 is shown in FIG. 3, network 300 may contain many taps 320, which may be interconnected, thereby enabling effective knowledge collection for a variety of network links 315. Taps 320 may also work independently using purely local information. Distributed algorithms may allow sharing of information among taps 320. In such a case, taps 320 may have a globally synchronized clock that allows information from multiple taps 320 to be combined. A clock resolution of the taps 320 may be finer than the data sampling resolution of the taps 320, so that information about transmissions (e.g., the start time, duration, inter-transmission gap, and even the presence of short transmissions) is not missed.

A tap 320 (or a network of taps 320) consistent with the invention may store the transmissions that it detects for a predetermined amount of time. For example, the round-trip time of a transport layer flow cannot be determined if the history that may be stored at tap 320 is less than one roundtrip time. The total volume of data that is stored depends, for example, on the capacity of the link 315 and the maximum round-trip time of flows seen on the link 315. Taps 320 may assign a unique identifier to each sending host 310, for example, based on the address of the gateway. Taps 320 in the network 300 may assign the same unique identifier to any given sending host 310.

Exemplary Stepping Stone Discovery

In one implementation consistent with principles of the invention, an attack attribution system is provided that is comprised of several algorithms, including one master function that monitors each of the individual algorithms relating to IP traceback and stepping stone discovery and aggregates their results into a composite score. In this manner, advantages and disadvantages inherent in the algorithms may be exploited or mitigated.

The master function operates to aggregate the results of these algorithms into a single score to be used to determine the correlated pairs of connections passing through this detection point. It has been determined that no stepping stone detection algorithm can issue a result with complete certainty.

That is, there is some degree of likelihood associated with each answer. Further, each of these algorithms uses its own method for determining a likely connection pair. Some use thresholds, some use probabilities, and some make declarative statements. The master function assimilates these answers, gives them the proper weight, and constructs an accurate representation of the consensus.

Regarding stepping stone detection, algorithms may use different characteristics to detect the stepping stones, and in doing so, are advantageous in some circumstances and not effective in others. For example, some algorithms use the content of the connection for correlation and others use the timing of the constituent packets. It has been found that content-based approaches are not effective for encrypted connections, and timing-based approaches are susceptible to jitter and other evasive techniques. Consequently, no single algorithm has been determined to be universally effective.

Accordingly, stepping stone algorithms generally have certain advantages and disadvantages, making them more or less suitable for certain types of networks or network traffic. Generally, there are three axes that define the space within which the algorithms fit: 1) how much data is required for the algorithm to produce a usable result; 2) whether the algorithm is content based or timing based; and 3) how resistant the algorithm is to evasive techniques.

Figure 4:
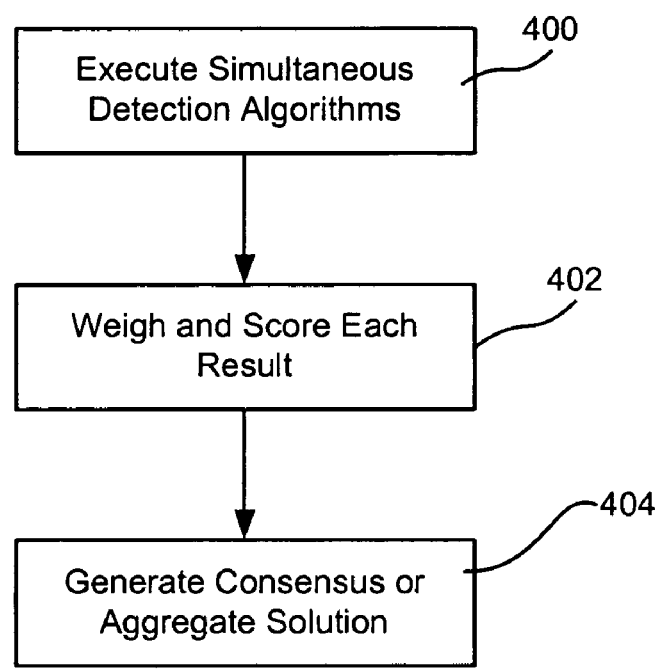
FIG. 4 is an exemplary flow diagram illustrating stepping stone detection in accordance with one implementation consistent with principles of the invention.

FIG. 4 is an exemplary flow diagram illustrating stepping stone detection in accordance with one implementation consistent with principles of the invention. In this implementation, a "master function" is utilized that aggregates the results of several algorithms in making a determination of the correlation of a pair of connections. Initially, several stepping stone detection algorithms with particular strengths are executed in parallel (act 400). The results of each algorithm are then scored, using some contextual information to give any one particular algorithm's results more or less weight (act 402). Results of similar algorithms are also considered; if two algorithms with different strengths agree, that may augment the score of either or both of the algorithms. A consensus or preferred connection or attack path is then generated (act 404) based upon the weighted results of act 402.

In accordance with the present implementation, a stepping stone detection system is utilized comprised of several algorithms, with one master function that monitors each of the individual algorithms and aggregates their results into a composite score. In this way, the advantages of each algorithm are exploited and the disadvantages of the selected algorithms are mitigated.

In one implementation consistent with principles of the invention, the master function may aggregate the results of these algorithms into a single score to be used to determine the correlated pairs of connections passing through this detection point. In a further implementation, this score may be a table of probabilities indicating the likelihood that a given connection represents a stepping stone. As stated above, no known stepping stone detection algorithm can issue a result with complete certainty; there is some degree of likelihood associated with each answer. Accordingly, the master function of the present invention assimilates these answers, gives them the proper weight, and constructs an accurate representation of the consensus.

Because included algorithms may be perform based on content correlation, these algorithms may not detect stepping stones used in encrypted connections, while other, typically timing-based algorithms may. Additionally, some algorithms are claimed to be resistant to evasive techniques, while others may not be as resistant. In one implementation consistent with principles of the invention, the master function considers the relative strengths of algorithms when aggregating their results so as not to discount the presence of a stepping stone when consensus cannot be achieved.

Additionally, it has been determined that reverse packet streams may also show strong evidence of connection correlations. Since a connection's forward and reverse packets can easily be identified, it has been found that correlations on both the forward path and the reverse path add to the overall strength of the correlation result. Consequently, in one implementation consistent with principles of the invention, the master function includes this determination when identifying stepping stones.

Additionally, the stepping stone detection architecture may consider the placement of the detection systems on the network. It has been found that most hosts are not multi-homed, and therefore use a single identifiable router for all incoming and outgoing traffic. This means that the router serving a host acting as stepping stone will see the traffic for both connections in the connection pair. Given that the router is the only sure point of commonality for the traffic, it may be an appropriate location for stepping stone detectors referred to as taps 320 in FIG. 3. In one implementation consistent with principles of the invention, tap or algorithm location may be factored into the weighting or adjusting process. For example, timing algorithms have been found to be more successful if they monitor the packets reasonably close to the stepping stone host, in which case the timing correlation will be more evident.

As an additional example, consider an "indirect" stepping stone, where H1 talks to H2, H2 talks to H3, and H3 talks to H4, but where only traffic for H1 and H4 are monitored by detection algorithms. It such a scenario, H1 and H4 may be correlated, even though they may have one or more stepping stone hosts between them (thus "indirect"). Detectors or algorithms placed in better locations will pick up the intervening stepping stones. Conversely, for detectors that cannot be placed so that they detect the intervening stepping stones, some algorithms may be applied that are better at doing indirect correlation than others (e.g., content-based algorithms).

The following stepping stone detection techniques are presented for exemplary purposes as potentially included within the master function implementation described above. It should be understood that one skilled in the art may implement any suitable method for detection stepping stones.

Host-based and network-based techniques—Some techniques require being present on the actual host that is the stepping stone. These techniques suffer from deployment, scalability, and trust problems, but are best positioned for detecting the chaining of connections. Network-based techniques examine traffic streams and attempt to pull from the flow of packets enough data to surmise the existence of a stepping stone host somewhere on the network.

Proactive vs. reactive detection—Proactive techniques continuously and without being prompted attempt to identify the presence of stepping stones in the traffic they are monitoring. Reactive techniques are driven by the occurrence of certain specific events.

Real-time vs. off-line analysis—It is possible for some techniques to issue detection results within a small amount of time of the existence of the stepping stone. These techniques calculate the probability of correlation faster than the occurrence of the events they are correlating. Other techniques require post mortem analysis either because they are computationally expensive or the data collection is too distributed.

Passive vs. active monitoring—Passive monitoring techniques examine the events, traffic or otherwise, without causing additional events or manipulating those that naturally occur. Active monitoring allows the introduction of artifacts such as markers in the packets or in the data within the packets in order to detect the presence of stepping stones.

Figure 5:
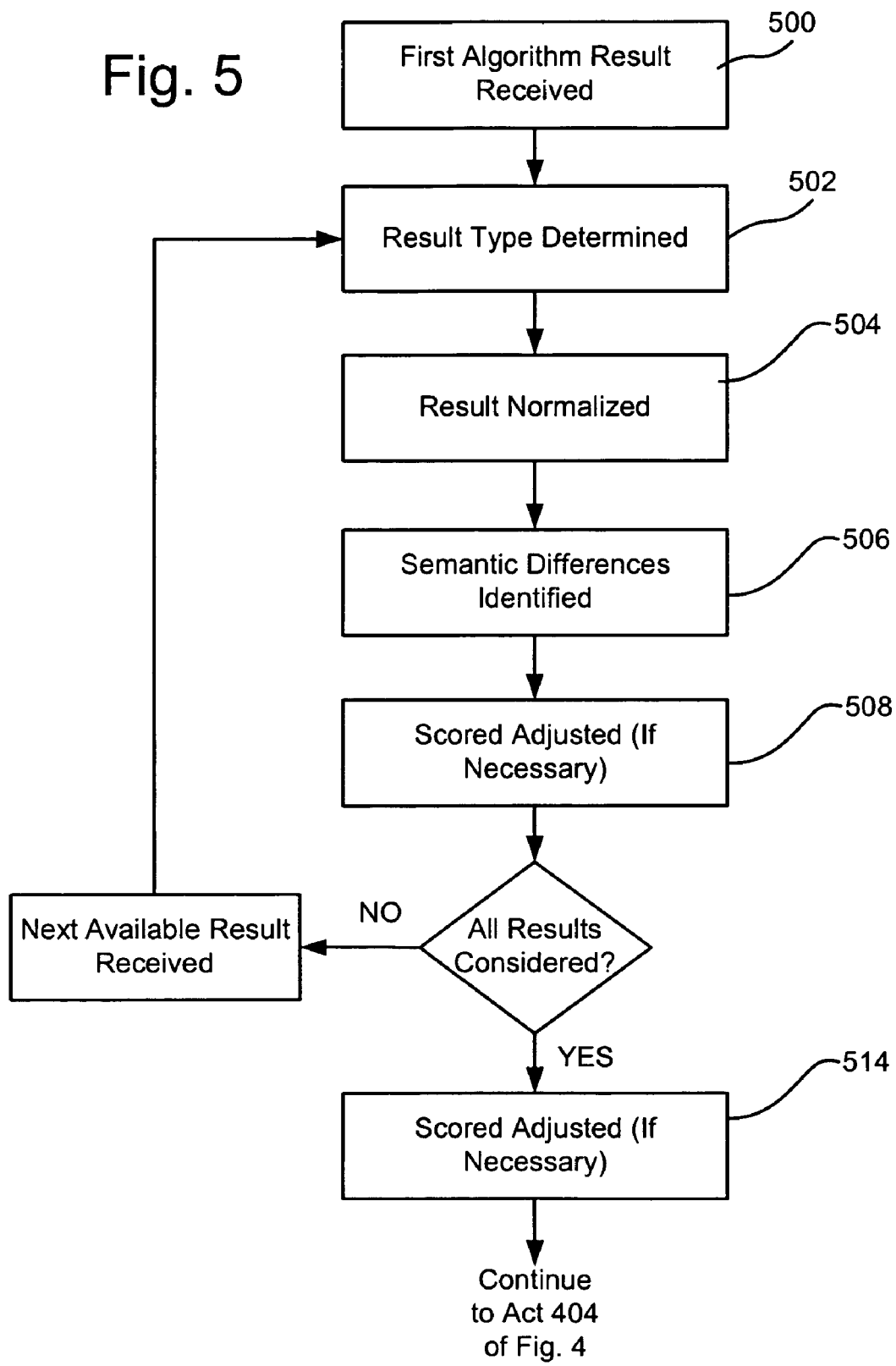
FIG. 5 is another exemplary flow diagram illustrating stepping stone detection in accordance with another implementation consistent with principles of the invention.

FIG. 5 is an exemplary flow diagram illustrating one implementation of the stepping stone detection scoring process of step 402 in FIG. 4. Initially, a first algorithm result is received (act 500). Next, it is determined what manner of score or result is received (i.e., probabilities, number of positive identifications for a particular time window, raw score, differing scale (e.g., 0-60, versus 0-100), etc.) (act 502). Depending upon the type of result received (result type being based upon the algorithm from which the result was received), the result is normalized (act 504). In one implementation consistent with the principles of the invention, the results are normalized to probabilities ranging from 0-1. For example, where an algorithm identifies likely stepping stone connections through a number of positive indications, this result can be normalized into a probability by identifying the total possible number of indications (something in the algorithm that states something positive about the relationship) and dividing that into the total number of positive indications, thus turning the score into a percentage.

Once the score or result has been normalized, it is next identified whether any semantic differences require the score to be discounted or emphasized (act 506). More particular, specifics relating to the type of stepping stone detection technique applied and the type of connection being monitored indicate a potential source of error or skewed results. For example, where a given stepping stone detection technique uses any form of content-based detection, scores from such algorithms are discounted for encrypted connections. In an encrypted connection, the content of a transmission through a host is modified through the encryption process, rendering content correlation schemes of reduced value. This may be true for any algorithm which measures a feature that shows up for some connections but not others, and another algorithm that measures those not picked up by the first.

Once any semantic elements are identified, the normalized score is adjusted, if necessary (act 508). At this point it is determined whether all applicable or available detection results have been considered (act 510). If not, the process continues to act 512 where the next available result is received. At this point, the process returns to act 502 for normalization and adjustment.

Once all detection results have been normalized and adjusted, the results are aggregated to generate a "consensus" score for each connection (act 514). In one implementation consistent with principles of the invention, a simple average is performed for each of the available scores to produce a single score for each connection. However, it should be understood than any suitable averaging or combining scheme may be used. Once the consensus score has been generated, the process continues to step 404 of FIG. 4. In this manner, an attack graph incorporating a plurality of stepping stone detection techniques may be generated to more accurately represent an attack's likely path through a network.

Conclusion

Methods and systems consistent with the principles of the invention may discover stepping stones within an attack path topology by examining results from multiple detection algorithms. The results are aggregated using defined weighting to maximize the benefits of each algorithm and mitigate the disadvantages.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

Moreover, the acts in FIGS. 4 and 5 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method, comprising:
    executing in parallel a plurality of stepping stone detection algorithms by utilizing at least one computing device, each of the plurality of stepping stone detection algorithms generating a result;
    scoring the results for each of the plurality of stepping stone detection algorithms;
    generating a consensus attack path based upon the scored results;
    normalizing the results; and
    aggregating the normalized results.

2. The method of claim 1, wherein aggregating the normalized results further comprises averaging the normalized results.

3. The method of claim 1, further comprising:
    adjusting the results based upon semantic differences of each algorithm.

4. The method of claim 1, wherein the plurality of stepping stone detection algorithms include content-based algorithms and timing-based algorithms.

5. The method of claim 1, wherein the scoring results for each of the plurality of stepping stone detection algorithms further comprises:
    receiving a result of one of the plurality of stepping stone detection algorithms;
    determining the type of result received;
    normalizing the result based upon the type of result received;
    identifying any semantic differences relating to the result received;
    adjusting the result received based upon the semantic differences;
    determining if each result from the plurality of stepping stone detection algorithms has been received;
    performing each of the receiving, determining, normalizing, identifying and adjusting steps if it is determined that each result from the plurality of stepping stone detection algorithms has not been received; and
    aggregating the results if it has been determined that each result from the plurality of stepping stone detection algorithms has been received.

6. A system, comprising:
    a plurality of hosts connected via links on a network;
    at least one tap on the network to monitor traffic between at least two of the plurality of hosts, wherein the tap is configured to execute a plurality of stepping stone detection algorithms, each of the plurality of stepping stone detection algorithms generating a result;

a computing system operatively coupled to the tap and configured to score the results for each of the plurality of stepping stone detection algorithms, the computing system further configured to generate a consensus attack path based upon the scored results;

normalize the results; and aggregate the normalized results.

7. The system of claim 6, wherein the computing system is further configured to average the normalized results.

8. The system of claim 6, wherein the computing system is further configured to adjust the results based upon semantic differences of each algorithm.

9. The system of claim 6, wherein the plurality of stepping stone detection algorithms include content-based algorithms and timing-based algorithms.

10. The system of claim 6, wherein the computing system is further configured to:

receive a result of one of the plurality of stepping stone detection algorithms;

determine the type of result received;

normalize the result based upon the type of result received;

identify any semantic differences relating to the result received;

adjust the result received based upon the semantic differences;

determine if each result from the plurality of stepping stone detection algorithms has been received;

perform each of the receiving, determining, normalizing, identifying and adjusting steps if it is determined that each result from the plurality of stepping stone detection algorithms has not been received; and aggregate the results if it has been determined that each result from the plurality of stepping stone detection algorithms has been received.

11. A non-transitory tangible computer-readable medium incorporating computer-executable instructions, comprising:

one or more instructions for executing a plurality of stepping stone detection algorithms, each of the plurality of stepping stone detection algorithms generating a result;

one or more instructions for scoring the results for each of the plurality of stepping stone detection algorithms, wherein the one or more instructions for scoring results further comprises one or more instructions for normalizing the results and one or more instructions for aggregating the normalized results; and one or more instructions for generating a consensus attack path based upon the scored results.

12. The non-transitory tangible computer-readable medium of claim 11, wherein the one or more instructions for aggregating the normalized results further comprise one or more instructions for averaging the normalized results.

13. The non-transitory tangible computer-readable medium of claim 11, further comprising:

one or more instructions for adjusting the results based upon semantic differences of each algorithm.

14. The non-transitory tangible computer-readable medium of claim 11, wherein the plurality of stepping stone detection algorithms include content-based algorithms and timing-based algorithms.

15. The non-transitory tangible computer-readable medium of claim 11, wherein the one or more instructions for scoring results, further comprises:

one or more instructions for receiving a result of one of the plurality of stepping stone detection algorithms; one or more instructions for determining the type of result received;

one or more instructions for normalizing the result based upon the type of result received;

one or more instructions for identifying any semantic differences relating to the result received;

one or more instructions for adjusting the result received based upon the semantic differences;

one or more instructions for determining if each result from the plurality of stepping stone detection algorithms has been received;

one or more instructions for performing each of the receiving, determining, normalizing, identifying and adjusting steps if it is determined that each result from the plurality of stepping stone detection algorithms has not been received;

and one or more instructions for aggregating the results if it has been determined that each result from the plurality of stepping stone detection algorithms has been received.

* * * * *